Dec. 23, 1952  R. B. HITCHCOCK ET AL  2,622,507
SAFETY DEVICE FOR BALERS
Filed Dec. 26, 1944  3 Sheets-Sheet 1

Inventors:
Rex B. Hitchcock
and Russell R. Raney,
by Paul O. Pippel
Attorney.

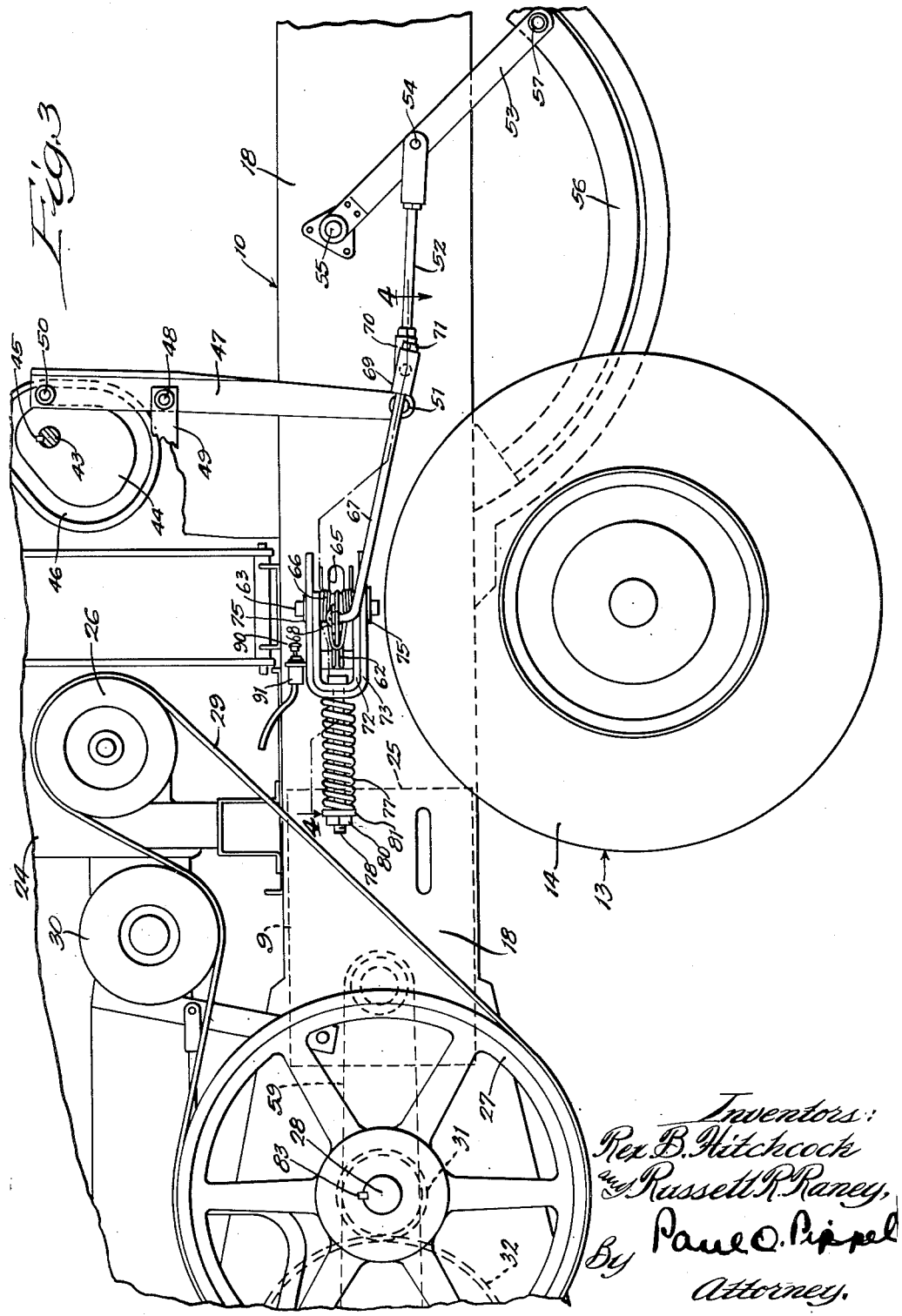

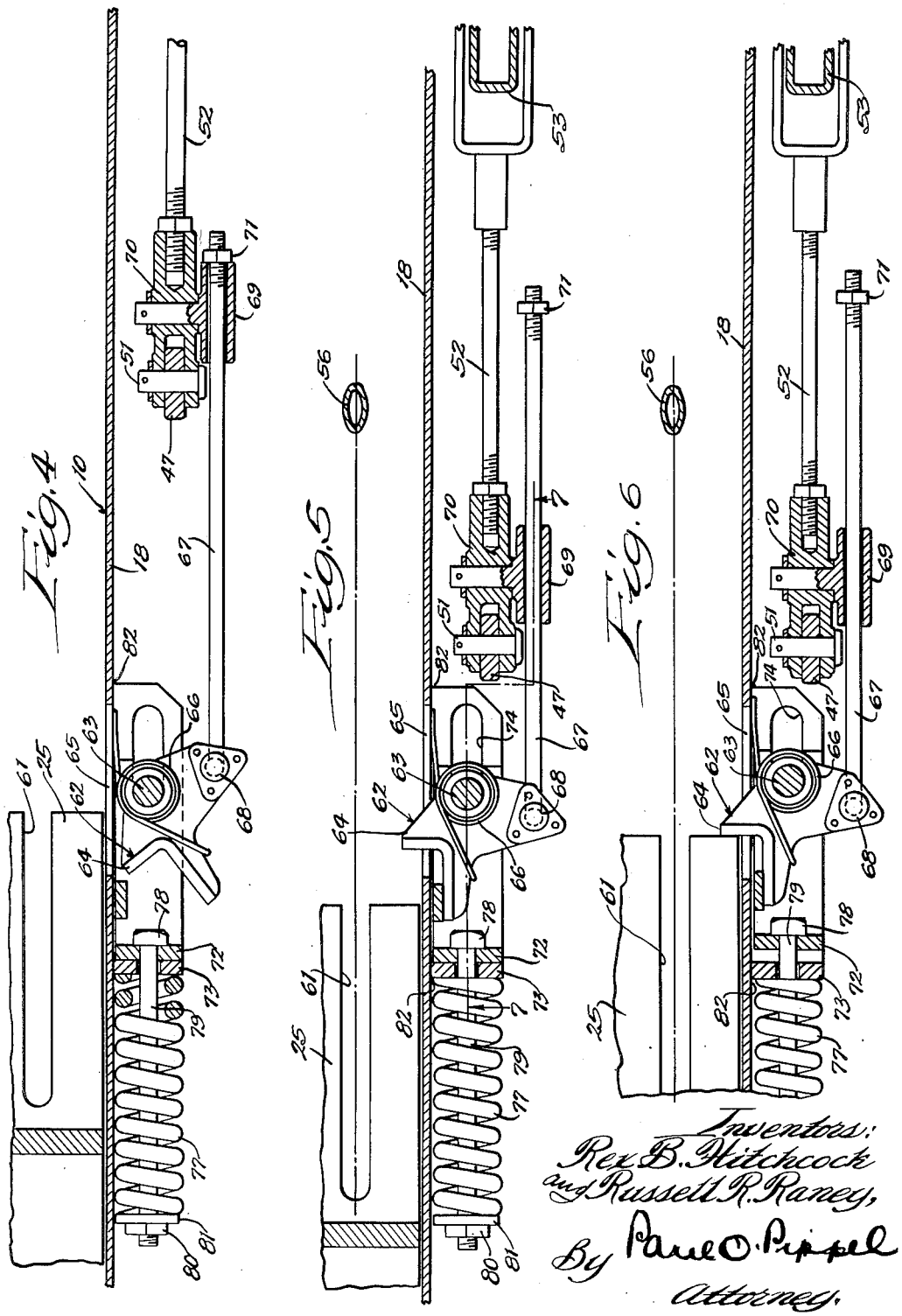

Patented Dec. 23, 1952

2,622,507

UNITED STATES PATENT OFFICE 2,622,507

SAFETY DEVICE FOR BALERS

Rex B. Hitchcock, Evanston, and Russell R. Raney, La Grange, Ill., assignors to International Harvester Company, a corporation of New Jersey Application December 26, 1944, Serial No. 569,703

6 Claims. (Cl. 100—3)

1

This invention relates to a new and improved safety device for balers, wherein mechanism is provided to prevent compression by a baling press plunger at all times when the bale tying needles are left in the bale forming chamber.

An important object of this invention is the provision of a needle protecting mechanism for balers in which the forward motion of a bale forming plunger is halted if the bale tying mechanism for the previously formed bale has not been removed from the bale forming chamber.

Another important object of this invention is to provide a means for retarding and ultimately stopping a bale forming plunger if the tying mechanism for the previously formed bale has not been fully removed from the bale forming chamber.

A further important object is a provision of means for physically stopping the forward motion of a bale forming plunger and simultaneously therewith to cut off the source of power for the plunger both mechanically and electrically.

Full automatic bale tying is a development of recent origin and hence has brought with it problems not heretofore encountered. In the continuously automatic forming and tying of bales it is necessary to provide a tying mechanism which has a means for carrying twine or other tying material through the bale forming chamber. This mechanism comprising a pair of twine carrying needles passes through the bale forming chamber and around a completed bale of material. A further "must" in automatic baling machines is a constantly reciprocating bale compressing plunger. These elements, namely, the needles coming through the bale chamber and the reciprocating plunger must be so timed that the plunger will never be advancing in the bale chamber at a time when the needles are extending unprotected through the bale forming chamber. The timing of these elements to gain such a result is possible but, in spite of this fact, mechanical failure of any of the driving elements of each of these parts might break this timing and, hence, it is a special object of this invention to eliminate the damage caused by such mechanical failure, that is bending or breaking of the needles and a resultant long tie-up of the baler during its repair.

Other and further important objects will become apparent in the disclosures in the following specification and accompanying drawings, in which:

Figure 1 is a perspective view of a pick-up baler

2 showing the safety device of this invention incorporated thereon;

Figure 3 is a side elevation of that portion of the baler including the safety device;

Figure 4 is a sectional view taken on the line 4—4 of Figure 3;

Figure 5 is a sectional view similar to Figure 4 showing the safety device in another position;

Figure 6 is another view similar to Figures 4 and 5 showing the safety device in actual operation.

As shown in the drawings:

Figure 1:
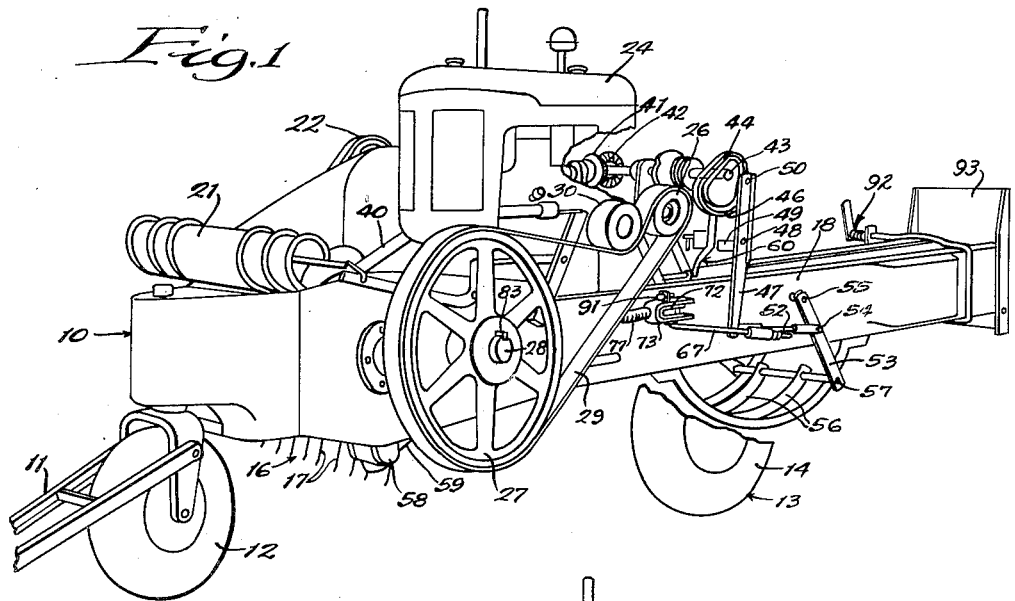

Reference numeral 10 indicates generally a pick-up baler having hitch means 11 at the forward end thereof for attachment to a tractor, or the like, not shown. A single wheel 12 supports the forward end of the baler 10 and a relatively wide spread two wheel truck 13 supports the rearward end of the baler 10. The wheel truck 13 comprises wheels 14 and 15. Wheel 15 is positioned outwardly of a pick-up device 16. The pick-up portion 16 of the baler 10 is of the type shown and described in detail in the application entitled "Pick-Up Baler," and having Serial No. 466,460, now Patent No. 2,450,082. This pick-up device includes a reel-like member having outwardly extending wire fingers 17 adapted to pick up hay or straw from the ground and throw it up over the top thereof into the path of an auger 9 which feeds the material toward the elongated bale forming chamber 18. Packer or feed fingers 19 are adapted to travel in a gyratory manner so as to take material extruded from the auger 9 and feed it through an opening 20 in the side wall of the bale chamber 18. The pick-up device further includes means for preventing the material to be baled from rising above the open end auger 9. A hold-down packer 21 in combination with a means 22 for permitting floating movement of the auger 9 through the arcuate slot 23 insures that the material picked up will be fed beneath the auger 9 in spite of the quantity of material.

An engine 24, mounted above the bale forming chamber 18, supplies the power for the pick-up mechanisms as well as the power for the bale forming plunger 25. A power take-off pulley 26 on the engine 24, best shown in Figure 1, is adapted to drive a fly-wheel 27, keyed to the shaft 28 which is journally mounted across the forward end of the bale forming chamber 18, by means of a belt 29 and an idler pulley 30. A gear 31 is likewise keyed to the shaft 28 within the elongated bale forming chamber 18. This gear 31 meshes with a larger gear 32 which is keyed to a cross-shaft 33, thus imparting driving means from the engine to the shaft 33.

Figure 2:
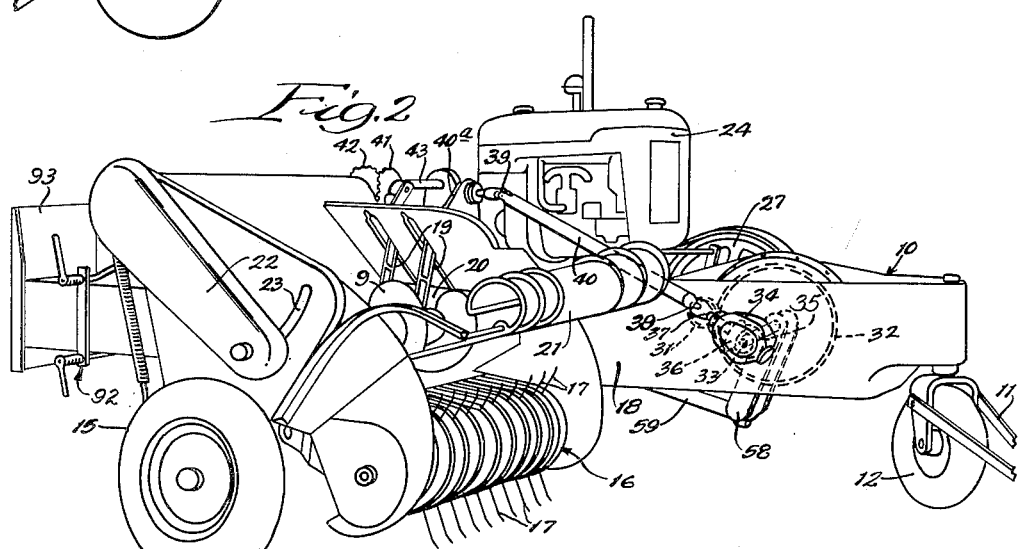
Figure 2 is a perspective view of the other side of the baler as shown in Figure 1.

A gear box 34 mounted on the outside of the bale chamber 18 and on the side opposite the fly-wheel 27 is adapted to be mounted over the driven shaft 33. A bevel gear 35 is affixed to the driven shaft 33 and meshes with a complementary bevel gear 36 also within the gear box 34 to effect a drive of the upwardly and rearwardly extending shaft 37. With the aid of universal joints 38 and 39 and a connecting drive shaft 40, the drive is carried rearwardly to drive the packer fingers 19 by a crank 40a and a bevel gear 41, best shown in Figure 2. The bevel gear 41 engages another bevel gear 42 at right angles thereto and mounted on a cross-shaft 43. The cross-shaft 43 extends outwardly behind the pick-up device 16 and thereby imparts rotation to the auger 9 down to the hinged floating arm 22. Drive for the pick-up reel is also taken from this driven shaft 43.

An irregular shaped wheel 44 is keyed or otherwise attached as at 45 to one extreme end of this shaft 43 and has on its outer face a cammed track or groove 46. An arm 47, pivoted at 48 on a fixed part of a frame 49, has an inwardly projecting pin 50 adapted to engage or ride within the groove 46 in the irregular shaped wheel 44. It will be seen that rotation of the shaft 43 and a corresponding rotation of the wheel 44 will effect an angular movement of the arm 47 about its pivot 48. Further, the degree of angular swinging of the arm 47 will be varied depending upon the position of the irregular shaped wheel 44. The lower end of the arm 47 is attached at 51 to a connecting link 52 which is joined at its other end to an arm 53 at 54. The arm 53 is hinged at 55 on the side of the bale chamber 18. The lower end of the arm 53 is attached to twine carrying needles 56 at 57. Angular swinging movement of the arm 47 by reason of the irregularly shaped wheel 44 will cause a movement of the needles 56 up through and a retraction from the bale chamber 18.

Material to be baled is picked up by the pick-up device 16 and fed by the auger 9 and the packing fingers 19 in varying amounts to the bale chamber 18. This material is fed into the chamber when the plunger 25 is fully retracted. The plunger 25, shown only in Figures 4, 5, and 6, is reciprocated within the bale chamber 18 by reason of a bifurcated crank 58, shown in Figure 2. The crank 58 is on, and is driven by the shaft 33 on which the large gear 32 is keyed. A connecting link 59 joins the bifurcated crank 58 with the plunger 25 and is adapted to swing through the bifurcated portions of the crank 58. After material to be baled is pushed into the bale forming chamber 18 by the packer fingers 19, the plunger 25 starts it compression stroke, whereupon the material inserted within the bale chamber is pushed forwardly and compressed with other previously inserted material until such time as a full bale is formed, whereupon the tying mechanism begins its operation with the needles 56 carrying the twine up through the bale chamber 18 where it feeds the twine to a knotting mechanism 60, shown diagrammatically in Figure 1. When the tying is completed the tied bale is pushed out the end of the bale forming chamber. Bale tensioning means 92 and tail-gate means 93 are positioned at the discharge end of the bale forming chamber.

There are occasions when the cam operation between the cam track 46 and the pin 50 fail to operate and the needles 56 are left up in the bale chamber when they should have been withdrawn. Under such a condition, the advancing plunger would cause bending or even breaking of the needles 56. A safety device is herein provided to prohibit a forward movement of the plunger when the needles have not been withdrawn from the bale chamber 18. In normal operation of the baler the twine carrying needles 56 come up through the baling chamber 18 and through the slots 61 in the end of the bale plunger 25 while the plunger is finishing its compression stroke and starting its withdrawal. When the needle is up in the bale chamber, the needle operating arm 53 is inclined downwardly and forwardly, rather than rearwardly when the needles are retracted. In such position, the connecting link 52 is moved forwardly and, as best shown in Figure 5, a plunger stop 62 pivoted at 63 is permitted to have a projecting portion 64 extending within the bale chamber 18 through a slot 65. The stop 62 is normally biased to rotate in a clockwise direction, as viewed in Figure 5, by reason of a spring 66. The interconnection between the link 52 and the stop 62 is best shown in Figures 4 and 5. A rod-like member 67 is attached to a stop 62 at 68. This rod extends rearwardly and through a sleeve-like member 69 which is pivotable about the end portion 70 of the connecting link 52. An adjustable stop nut 71 is provided at the end of the rod member 67 and is adapted to abut the sleeve 69 upon rearward movement of the connecting link 52. As the needles are fed up through the bale chamber 18, the end 70 of the connecting link 52 is free to move forwardly on the rod 67 without effecting movement of the stop 62 other than to permit the spring 66 in the stop to cause its projection 64 to extend in the path of the bale plunger 25. When the needles 56 are properly withdrawn from the bale chamber 18, the connecting link 52 is moved rearwardly by the swinging action of the lever arm 47 so that the sleeve 69 contacts the adjustment nut 71 just before the end of the needle retraction and the rod member 67 is moved with the needle to effect a withdrawal of the stop 62 from the bale chamber 18 by reason of its rotation about the vertical shaft 63. The bale plunger 25 is now free to move rearwardly and compress new material in the formation of a bale without interference from the stop 62.

In all regular operation of the baler, the stop 62 does not enter into the operation, but rather it is only employed when the needles 56 are not properly withdrawn from the bale chamber 18. It will be understood that when the needles are accidentally left in the bale chamber 18, the stop 62 and particularly its projection 64 will not be removed from the bale chamber 18, but will remain directly in the path of the bale plunger 25. In such event, the plunger 25 will not be permitted to move rearwardly in its compression stroke beyond the stop projection 64 and, hence, cannot break or bend the needles 56.

Figure 7:
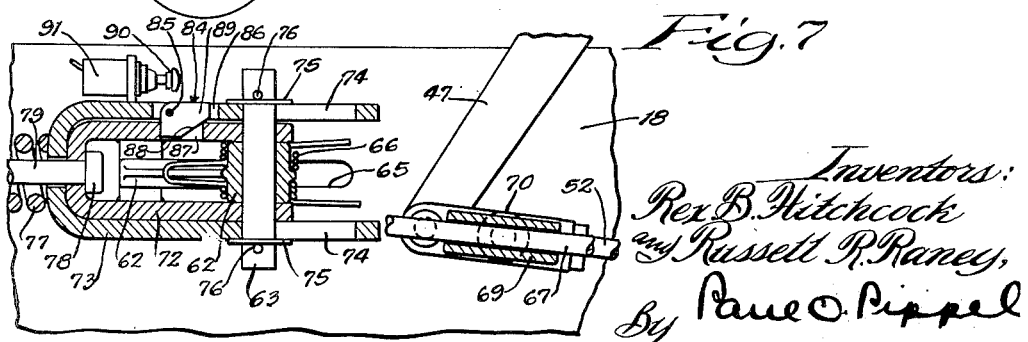
Figure 7 is a sectional view taken on the line 7—7 of Figure 5.

The stop 62, as best shown in Figure 7, is mounted on its pivot shaft 63 in a yoke member 72. The yoke member 72 is slidable within a superposed yoke 73. The pivot shaft 63 has both of its ends extending through opposed aligned slots 74 in the outer yoke member 73. Washer members 75 surrounding the shaft 63 and retained flush with the outer surfaces of the yoke 73 by pins 76 are adapted to prevent the shaft 63 from accidental removal. A compression spring 77 is connected to the inner yoke member by a bolt-like member 78 having its head within the yoke 72 and its shank portion 79 extending without and within the coils of the spring 77. A nut and washer 80 and 81, on the bolt shank 79, respectively, are adapted to engage the end of the spring 77 as best shown in Figures 4 and 5. The outer yoke 73 is welded or otherwise attached at 82 to the wall of the bale chamber 18. The inner yoke 72 in contradistinction to the outer yoke 73 is permitted longitudinal sliding movement with respect to the stationary outer yoke. The spring 77 thus acts to restrain movement of the stop member 62 against longitudinal movement. When the plunger 25 strikes the ledged projection 64 of the stop 62, it acts to compress the spring 77 upon movement of the inner yoke 72 with respect to the outer yoke 73. A sudden stopping of the plunger 25 without some cushioning effect might be very detrimental to the baler and, hence, the spring energy absorbing means just described is incorporated in the operation of the safety device. A shear key or pin 83 is provided in the fly-wheel 27 between the fly-wheel and the shaft 28 so that when the plunger 25 has arrived at its cushioned stop, stopping of the plunger 25 will cause the key 83 to shear and thus stop driving movement of the plunger 25 by the source of power.

In addition to the mechanical stopping of power by the shearing of the key 83, a secondary stopping means is used to cut out the motive power of the engine 24. The means for stopping the motive power of the power source employed may be any one of several forms depending on the type of power source employed. In the present case, an internal combustion engine is used and one effective way to stop the engine is to break the electrical ignition circuit. However, if the power source were a steam engine or a diesel engine, the method of stopping it would probably be by a valve in the fuel line. The device here is best shown in Figure 7 of the drawings where an actuating member 84 is hinged to the outer stationary yoke member 73 at 85 within a cut out portion 86. The actuating member 84 projects downwardly within a line slot 87 in the inner slidable yoke member 72. This actuating member 84 has an inclined surface 88 arranged so that respective movement between the yokes 72 and 73 will cause an upward swinging movement of the actuating member 84 and an upper portion 89 will strike an electrical switch button 90 of a switch 91 adapted to engage and disengage the electrical ignition system of the engine 24. When the button 90 is depressed by the actuating member 84, the ignition circuit for the engine 24 is broken, thereupon stopping operation of the engine. It will be seen that the dual power stopping means, that is, the mechanical shearing of the pin 83 and the breaking of the electrical ignition circuit of the engine 24, will guarantee the stopping of the plunger 25 to protect the needles not withdrawn from the baling chamber and in so doing will not cause injury to any of the baler's structural elements.

The safety device of this invention greatly enhances the value of all automatic balers and especially the pick-up baler type. The operators of such balers are saved the task of hunting down replacement needles which are bent or broken by some simple mechanical failure.

Numerous construction details may be varied without departing from the scope of this invention and we, therefore, do not propose limiting the patent granted hereon otherwise than as necessitated by the appended claims.

What is claimed is:

1. In a baler having a bale forming chamber, a plunger adapted to be reciprocated in said bale chamber, an engine adapted to drive a fly-wheel which in turn causes reciprocation of the plunger through a crank means, automatic tying means for the bales of material, said automatic tying means including tie-strand carrying needles, an operating arm adapted to mechanically project said needles through the baling chamber upon completion of a bale of material, means for stopping movement of the plunger when the needles are within the bale forming chamber, said means comprising a stop element having a portion thereof capable of projecting through an aperture in the bale forming chamber and within the path of the reciprocating plunger, and interlocking means between said stop element and said needles, whereby when the needles are within the bale forming chamber the stop member projects in the bale chamber in the path of the plunger, said interlocking means comprising a sleeve on said operating arm, a rod-like member extending from said stop element and adapted to slide within said sleeve on the operating arm for said needles, and stop means at the end of said rod.

2. In a baler having a bale forming chamber, a plunger adapted to be reciprocated in said bale chamber, an engine adapted to drive a fly-wheel which in turn causes reciprocation of the plunger through a crank means, automatic tying means for the bales of material, said automatic tying means including tie-strand carrying needles, an operating arm adapted to mechanically project the needles through the baling chamber upon completion of a bale of material, means for stopping movement of the plunger when the needles are within the bale forming chamber, said means comprising a stop element having a portion thereof capable of projecting through an aperture in the bale forming chamber and within the path of the reciprocating plunger, and interlocking means between said stop element and said needles, whereby when the needles are within the bale forming chamber the stop member projects in the bale chamber in the path of the plunger, said interlocking means comprising a sleeve on said operating arm, a rod-like member extending from said stop element and adapted to slide within the sleeve on the operating arm for said needles and stop means at the end of said rod, said stop means including a nut threadedly engaging said rod-like member and axially adjustable so that said plunger stop element will not be removed from said bale forming chamber until the needles are entirely removed from said chamber.

3. In a baler having a bale forming chamber, a plunger adapted to be reciprocated in said bale chamber, an engine adapted to drive a fly-wheel which in turn causes reciprocation of the plunger through a crank means, automatic tying means for the bales of material, said automatic tying means including tie-strand moving needles adapted to be mechanically projected through the baling chamber upon completion of a bale of material, and means for arresting movement of the plunger when the needles are within the bale forming chamber, said means for arresting movement of the plunger comprising a hinged stop member, and spring means restraining said hinged stop member against longitudinal movement, whereby when the plunger strikes the hinged stop member it will act against said spring means.

4. In a baler having a bale forming chamber, a plunger adapted to be reciprocated in said bale chamber, an engine adapted to drive a fly-wheel which in turn causes reciprocation of the plunger through a crank means, automatic tying means for the bales of material, said automatic tying means including tie-strand moving needles adapted to be mechanically projected through the baling chamber upon completion of a bale of material, and means for arresting movement of the plunger when the needles are within the bale forming chamber, said means for arresting movement of the plunger comprising a hinged stop member, spring means restraining said hinged stop member against longitudinal movement, whereby when the plunger strikes the hinged stop member it will act against said spring means, and a second spring means adapted to normally urge said hinged stop member within said bale forming chamber.

5. In a baler having a bale forming chamber, a plunger adapted to be reciprocated in said bale chamber, an engine adapted to drive a fly-wheel which in turn causes reciprocation of the plunger through a crank means, automatic tying means for the bales of material, said automatic tying means including tie-strand carrying needles adapted to be mechanically projected through the baling chamber upon completion of a bale of material, and means for arresting movement of the plunger when the needles are within the bale forming chamber, said means for arresting movement of the plunger comprising a hinged stop member, spring means restraining said hinged stop member against longitudinal movement, whereby when the plunger strikes the hinged stop member it will act against said spring means, a second spring means adapted to normally urge said hinged stop member within said bale forming chamber, and link means between said hinged stop member and said needles arranged so that said hinged stop member will be positioned within said bale forming chamber at all times when the needles are within the bale forming chamber and the hinged stop member will be removed from the bale chamber only when the needles are removed from the bale chamber.

6. In a baler having a bale forming chamber, a plunger adapted to be reciprocated in said bale chamber, an engine adapted to drive a fly-wheel which in turn causes reciprocation of the plunger through a crank means, automatic tying means for bales of material, said automatic tying means including tie-strand carrying needles adapted to be mechanically projected through the baling chamber upon completion of the forming of a bale of material, and means for stopping movement of the plunger when the needles are within the bale forming chamber, said means for stopping movement of the plunger comprising a hinged stop member, spring means restraining said hinged stop member against longitudinal movement, whereby when the plunger strikes the hinged stop member it will act against said spring means, a second spring means adapted to normally urge said hinged stop member within said bale forming chamber, link means between said hinged stop member and said needles arranged so that said hinged stop member will be positioned within said bale forming chamber at all times when the needles are within the bale forming chamber and the hinged stop member will be removed from the bale chamber only when the needles are removed from the bale chamber, and means operable in response to the plunger striking the stop member for stopping operation of said engine during longitudinal movement of the spring means retained hinged stop member when the plunger strikes said hinged stop member.

REX B. HITCHCOCK.
RUSSELL R. RANEY.

REFERENCES CITED

The following references are of record in the file of this patent:

UNITED STATES PATENTS

| Number | Name | Date |
|---|---|---|
| 406,455 | Maurer | July 9, 1889 |
| 1,685,098 | Sklovsky | Sept. 25, 1928 |
| 1,855,838 | Kranick | Apr. 26, 1932 |
| 2,124,965 | Lind | July 26, 1938 |
| 2,236,628 | Nolt | Apr. 1, 1941 |
| 2,362,861 | Russell | Nov. 14, 1944 |
| 2,405,688 | Crumb | Aug. 13, 1946 |
| 2,458,531 | Rust | Jan. 11, 1949 |